Aug. 12, 1924.

N. H. ANDERSON

DIAL SCALE 1,504,202

Filed Feb. 3, 1921   2 Sheets-Sheet 1

INVENTOR.

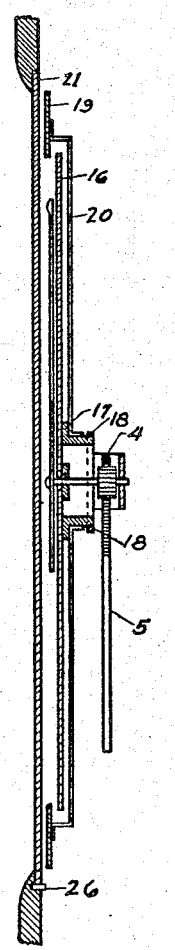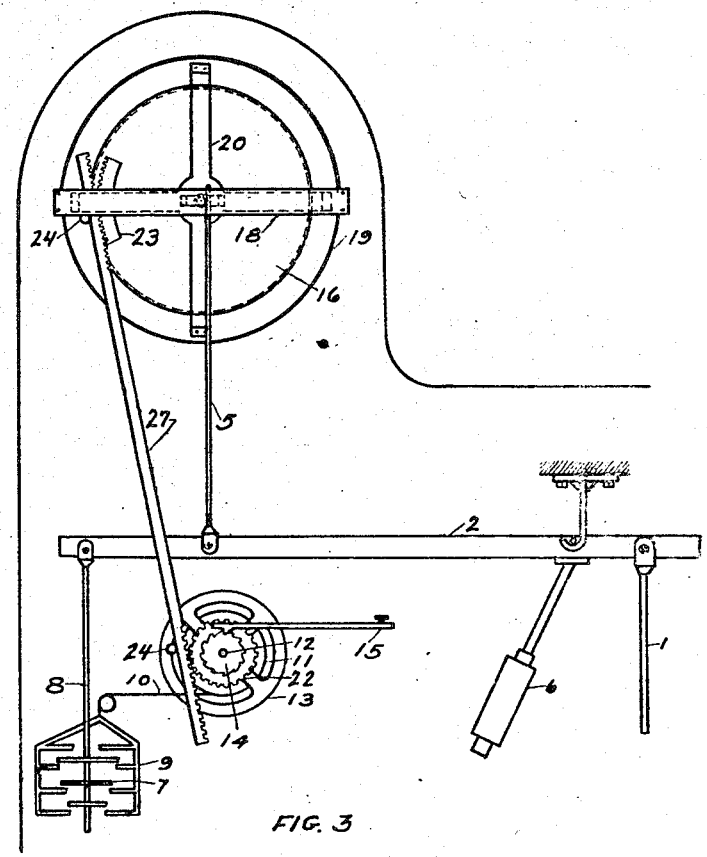
FIG. 4
FIG. 3

Patented Aug. 12, 1924.

1,504,202

UNITED STATES PATENT OFFICE.

NILS H. ANDERSON, OF BRIDGEPORT, CONNECTICUT, ASSIGNOR TO E. AND T. FAIRBANKS AND COMPANY, OF ST. JOHNSBURY, VERMONT, A CORPORATION OF VERMONT.

DIAL SCALE.

Application filed February 3, 1921. Serial No. 442,323.

*To all whom it may concern:*

Be it known that I, NILS H. ANDERSON, a citizen of the United States, residing at Bridgeport, in the county of Fairfield and State of Connecticut, have invented a new and useful Improvement in Dial Scales, of which the following is a specification.

This invention relates to dial scales of the type illustrated in the U. S. patent to L. A. Osgood, No. 1,159,412, November 9, 1915, in which, through the use of independent counterpoise weights the dial capacity may be increased through successive steps or ranges from zero to a predetermined maximum; and the invention resides more particularly in the dial mechanism by which the total load weighed is directly indicated without necessity of any correction or addition due to the particular number of counterpoise weights employed.

Figure 1:
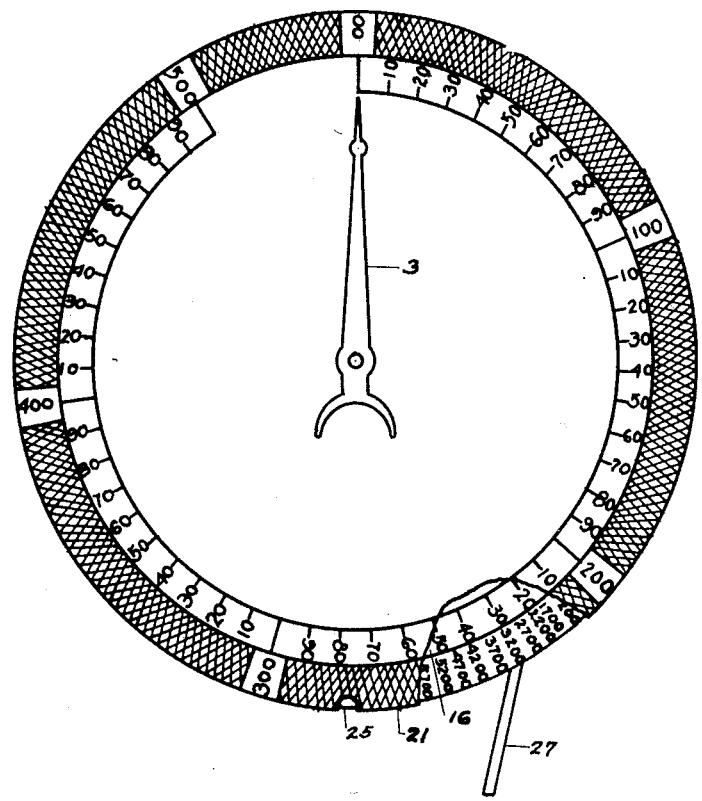
Figure 2:
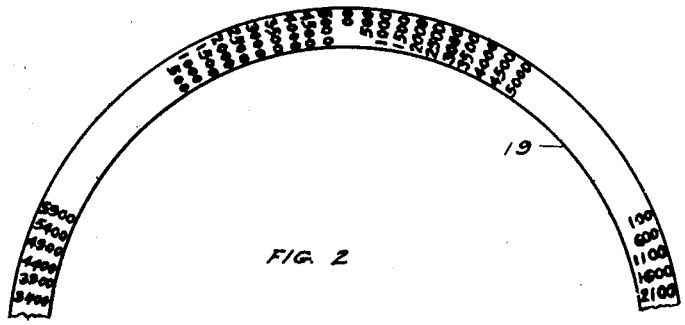

In the drawings which illustrate an embodiment of the invention, Fig. 1 is a front view of the dial mechanism removed from its case; Fig. 2 is a detail of the movable dial ring; Fig. 3 is a rear view showing the actuating mechanism and the counterpoising means of the scale; and Fig. 4 is a central vertical section of the dial mechanism.

The weight of a load upon the platform or other load-receiver (not shown) is transmitted through the rod 1 to the beam 2 in proportionate amount, and the resultant movement of the beam is indicated by the pointer 3, actuated by the pinion 4 and rack rod 5. In the case illustrated, the total capacity of the scale is 5000 lbs., and obviously, if a dial of normal size were used and subdivided from 0 to 5000, the graduations would be so condensed that it would be impossible to read the indications with sufficient precision. In order to provide a more open scale without increasing the size, the counterpoise pendulum 6 attached to the beam is designed to balance loads of from 0 to 500 lbs. only, and the pointer is actuated proportionately, the 500 lb. load causing the pointer to traverse its full range of movement, which may be slightly less than a complete revolution.

For loads between 500 and 1000 lbs. one of the counterpoise weights 7, is deposited on the hanger 8, its effect being to balance exactly 500 lbs. on the platform, and the pointer assumes a position corresponding to the excess over 500 lbs. For greater loads, additional counterpoise weights are placed on the hanger each weight advancing the capacity by 500 lbs. The mechanism for applying the counterpoise weights, may include a supporting cage 9, connected by a flexible member 10, to a drum 11 on a shaft 12, to which are fixed a hand wheel 13 and a ratchet wheel 14. The latter is engaged by a tooth on a pivoted lever 15, which permits a controlled movement of the cage to adjust the counterpoise weights as desired.

Referring now to the dial mechanism which forms the essential part of this invention, there is provided a fixed circular dial 16 uniformly graduated through almost its entire circumference. The pointer 3 is mounted to rotate thereover and plays over the graduated surface to indicate the various loads, but if the load is not exactly balanced, the pointer will rest over the ungraduated space. Slightly in front of the dial, is a flat dial ring 19, of larger diameter, the inner edge of the ring slightly overlapping the outer edge of the dial. The ring is carried by a supporting spider 20, rotatably mounted on the flanged collar 17, which is secured to the frame member 18, as by a screw threaded connection. The fixed dial 16 may be conveniently supported by the collar 17.

In front of the dial members, is a plate or disk of glass 21, having spaced arcuate portions thereof rendered opaque as by frosting or painting, preferably on the inner surface, these portions being indicated by the sectioning in Fig. 1. The remaining portions are clear or transparent, thus permitting the pointer and fixed dial to be always visible but shielding the ring from view with the exception of the portions visible through the small rectangular clear spaces that separate the frosted areas. The notch 25 at the lower edge of the glass disk is engaged by the pin 26 to hold the disk in fixed position.

In numbering the graduation marks on the dial 16, the numerals at the several hundred-pound marks are omitted, and only the minor or subsidiary numerals under each hundred are applied, as from 10 to 90, since these remain the same for all capacities. The omitted major or controlling numerals which are the consecutive hundreds of pounds from 0 to 500 are placed on the ring so as to register with the small rectangular clear spaces of the glass disk 20 and be visible therethrough, as shown in Fig. 1. Each of said numerals forms the first term of a series of numbers in arithmetical progression arranged on the dial ring, the common increment being 500; so that with a suitable small angular movement of the ring, the second term only of each series will be visible, providing a dial range of 500 to 1000, and likewise successively higher ranges as the capacity of the scale is increased.

To control the movement of the dial ring in proper relation to the counterpoising of the scale, the rack rod 27 is provided, engaging at its lower end, a pinion 22 fixed on shaft 12, and at its upper end, a gear segment 23, attached to the spider 20. Suitable guides or rollers 24, maintain the rack rod in proper contact with the gear members.

It will be understood that the graduations here shown are merely illustrative and may be varied to suit different sizes of scales, and that numerous other details may be changed without departing from the spirit and scope of the invention as defined in the appended claims.

I claim:

1. A registering mechanism including a pair of graduated dials arranged one in back of the other, the rear dial being stationary, the front dial including a ring-shaped body and being adapted to rotate with respect to said rear dial, the inner edges of said front dial overlapping the outer edges of said rear dial, the graduations on one of said dials being interpretive of the graduations on the other of the same.

2. A registering mechanism including a pair of graduated dials arranged one in back of the other, the rearmost dial being stationary, the front dial including a ring-shaped body and being adapted to rotate with respect to said rear dial and means for covering portions of one of said dials whereby certain of the graduations thereof will be hidden.

3. A registering mechanism including a pair of graduated dials arranged one in back of the other, the rearmost dial being stationary, the front dial including a ring-shaped body and being adapted to rotate with respect to said rear dial and means for covering portions of said ring-shaped dial whereby certain of the graduations thereof will be hidden.

4. A registering mechanism including a pair of graduated dials rotatable relative to each other, one of said dials presenting a ring-shaped body, the inner edge of said last named dial being of less length than the outer edge of the other dial, the edge portions of said dials being disposed adjacent to each other, whereby one of said dials will overlap the other of the same.

5. A registering mechanism including a pair of graduated dials rotatable relative to each other, one of said dials presenting a ring-shaped body, said ring-shaped dial being disposed in advance of the other dial and having its inner edge overlapping the outer edge of said other dial.

6. A registering mechanism including a pair of graduated dials rotatable relative to each other, one of said dials including a ring-shaped body having its inner edge disposed adjacent the outer edge of the other dial, the graduations on one of said dials being interpretive of the graduations on the other of the same and means for covering portions of one of said dials whereby certain of the graduations carried by the same are hidden.

7. A registering mechanism including a pair of graduated dials rotatable relative to each other, one of said dials including a ring-shaped body having its inner edge disposed adjacent the outer edge of the other dial, the graduations on one of said dials being interpretive of the graduations on the other of the same and means for covering portions of said ring-shaped dial whereby certain of the graduations carried by the same are hidden.

8. A registering mechanism including in combination a pair of graduated dials, the graduations on one of said dials being interpretive of the graduations on the other of the same and means arranged in advance of both of said dials and covering portions of one of the same whereby certain of the graduations carried thereby are hidden.

9. A registering mechanism including in combination a pair of graduated dials, the graduations on one of said dials being interpretive of the graduations on the other of the same, a cover for said dials and non-transparent portions forming a part of said cover and in advance of one of said dials whereby certain graduations of said dial are hidden.

10. A scale including in combination a weighing mechanism, registering means connected with said weighing mechanism, a rotatably mounted dial forming a part of said registering means, a shaft, means connected with said shaft for depositing weights upon said weighing mechanism, a pinion connected with said dial, a further pinion connected with said shaft and rack portions presented by said shaft and engaging said pinions whereby upon said shaft being rotated to actuate said weight depositing mechanism, said rotatable dial will register said movement.

11. In a scale, a movable pointer, load balancing means connected thereto, means including a rotatable shaft for variably counter-poising the same, a rotatable dial bearing sets of load-indicating numbers, a rack rod in operative connection with said dial and rotatable shaft, and means in front of the dial for concealing such portions thereof that the proper set of numbers on the dial will be exhibited according to the counterpoising, and all other sets concealed.

12. In a dial scale, provided with counterpoising means for changing the capacity, a rotatable dial ring carrying a plurality of series of numbers, a fixed dial coaxial therewith and bearing subsidiary numbers and graduation marks, a pointer movable over the dial, a glass cover having spaced opaque portions and intermediate clear portions adapted to expose limited portions of the dial ring and means controlled by counterpoising for actuating the dial ring whereby the load indications are varied as the capacity is changed.

13. In a scale, balancing means and a pointer actuated thereby, additional counterpoising means, a dial mechanism cooperating with the pointer comprising a rotatable dial ring bearing major graduation numbers in sets, a fixed graduated dial adjacent thereto bearing subsidiary graduation numbers, and a fixed cover plate having transparent portions to expose the fixed dial and one set only of the numbers on the dial ring, and opaque portions to conceal the remaining set of numbers, and means for positioning the dial ring in accord with the counterpoising means.

NILS H. ANDERSON.